No. 894,444. PATENTED JULY 28, 1908.
W. P. KIDDER.
CONTROLLING DEVICE.
APPLICATION FILED MAY 18, 1903.

2 SHEETS—SHEET 1.

WITNESSES:
INVENTOR:

No. 894,444. PATENTED JULY 28, 1908.
W. P. KIDDER.
CONTROLLING DEVICE.
APPLICATION FILED MAY 18, 1903.

2 SHEETS—SHEET 2.

WITNESSES:
INVENTOR:

UNITED STATES PATENT OFFICE.

WELLINGTON PARKER KIDDER, OF BOSTON, MASSACHUSETTS.

CONTROLLING DEVICE.

No. 894,444.

Specification of Letters Patent.

Patented July 28, 1908.

Application filed May 18, 1903. Serial No. 157,525.

*To all whom it may concern:*

Be it known that I, WELLINGTON PARKER KIDDER, citizen of the United States, residing at Boston, in the county of Suffolk and State of Massachusetts, have invented certain new and useful Improvements in Controlling Devices, of which the following is a specification, reference being had therein to the accompanying drawing.
This invention relates to means of controlling power transmission and braking mechanism. One of the objects thereof is to provide a simple and efficient device whereby power transmission mechanism may be controlled.

Another object is to provide convenient and reliable brake controlling means.

Another object is to provide means whereby brakes may be applied and the clutch of the power transmission mechanism be thrown out simultaneously therewith.

Another object is to provide devices of the above types having mutually acting connecting means whereby the condition of one of the same is affected by the position of the other.

Other objects will be in part obvious and in part pointed out hereinafter.

The invention accordingly consists in the features of construction, combinations of elements and arrangements of parts which will be exemplified in the mechanism herein described and the scope of the application of which will be indicated in the following claims.

Figure 1:
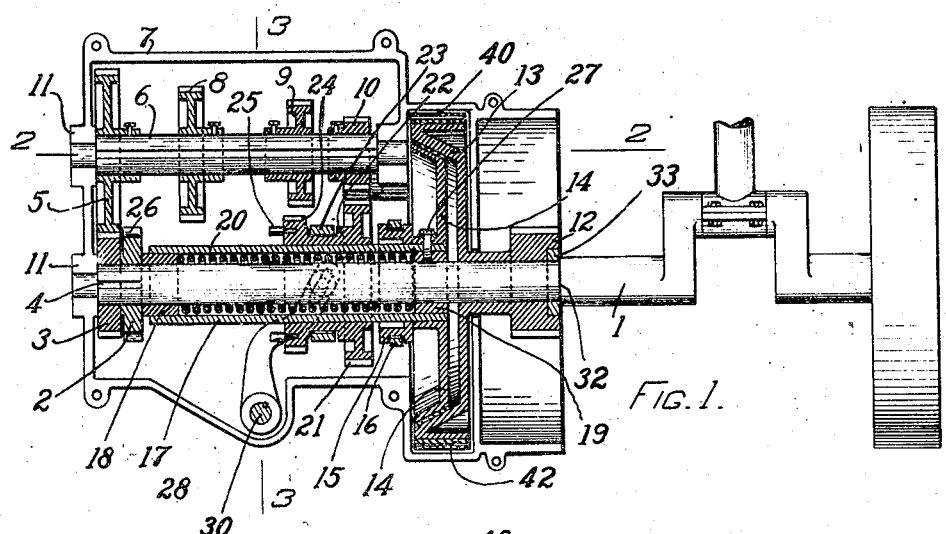
Figure 2:
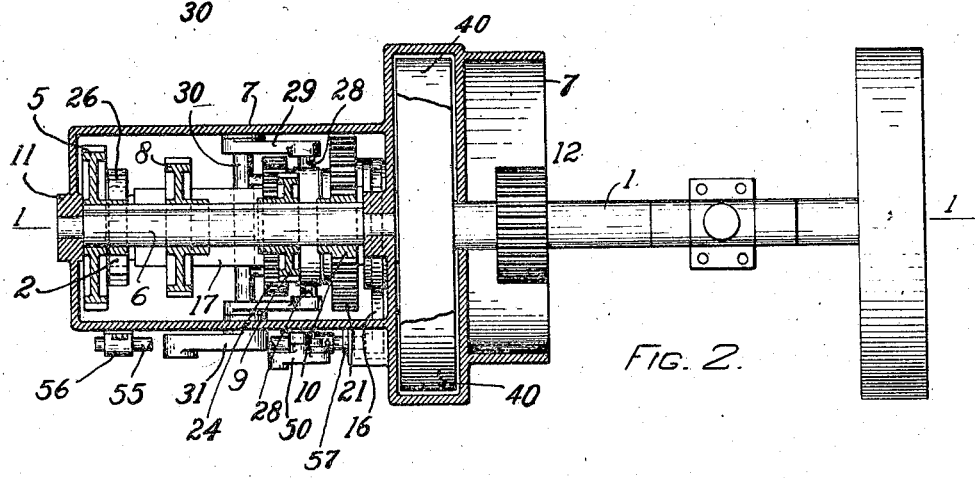
Figure 3:
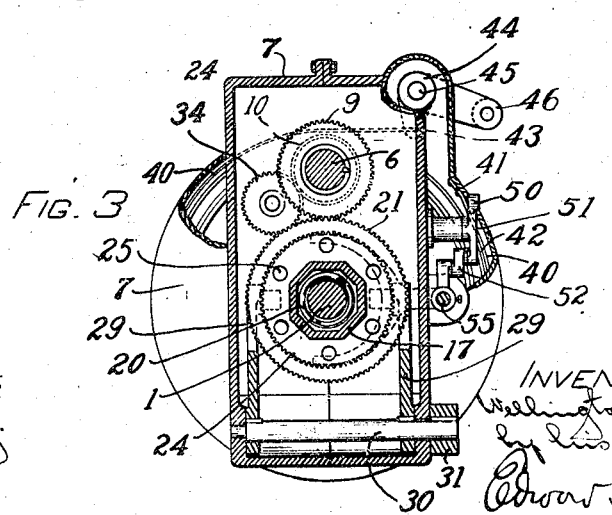
Figure 4:
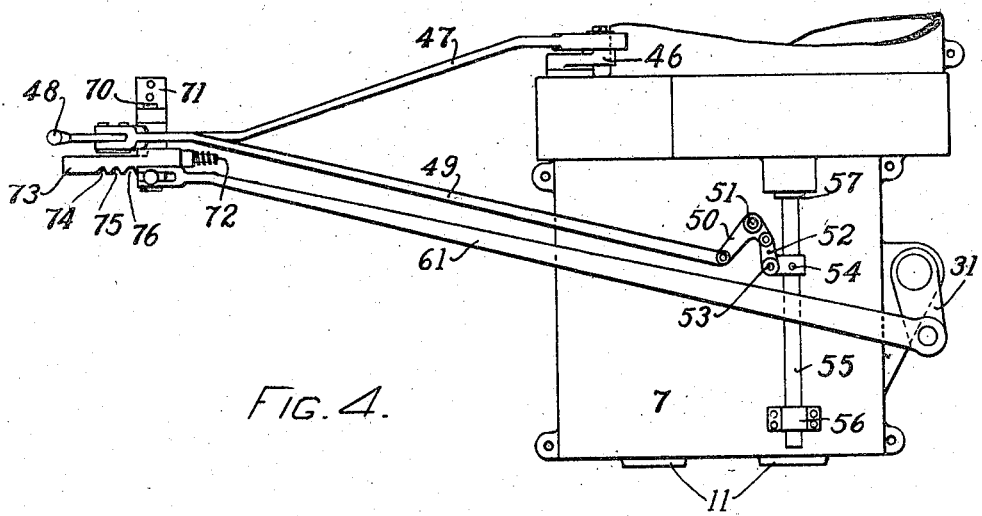
Figure 5:
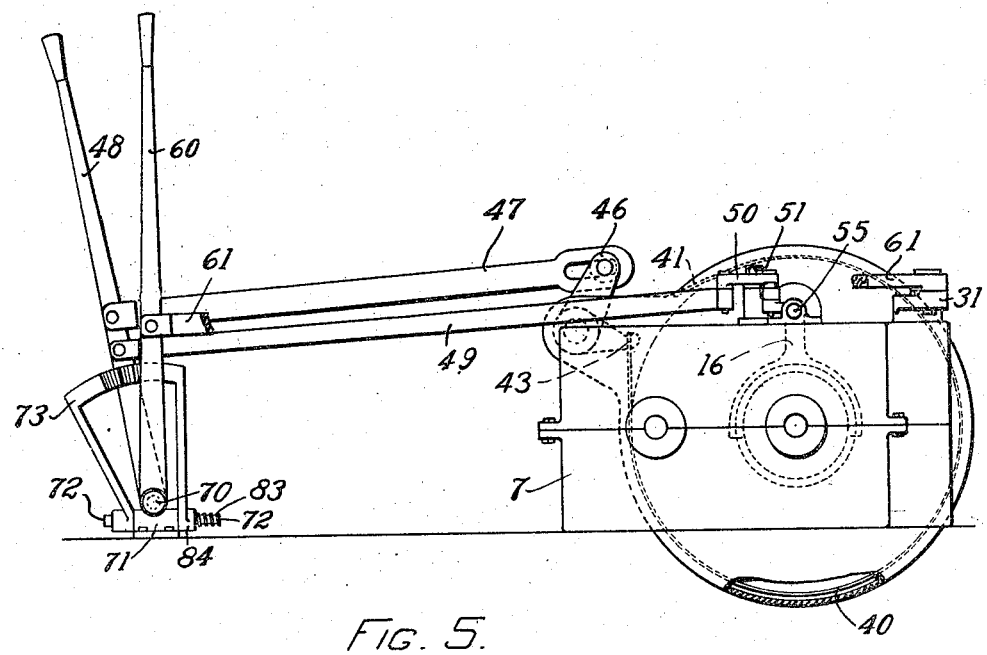
Figure 6:
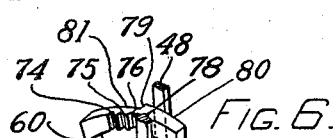

In the accompanying drawings, wherein is shown one of the various possible embodiments of my invention, Figure 1 is a sectional elevation of power transmitting and braking mechanism, taken on the line 1, 1, Fig. 2. Fig. 2 is a sectional plan of the same taken on the line 2, 2, Fig. 1. Fig. 3 is a vertical cross-section taken on the line 3, 3, Fig. 1. Fig. 4 is a plan showing controlling levers and their connection with braking and power transmitting mechanisms. Fig. 5 is an elevation of the same, certain parts being broken away. Fig. 6 is a detail perspective of the interlocking mechanism.
Similar reference characters refer to similar parts throughout the several views.

In order to render clearer the description of the embodiment of my invention hereinafter set forth, it may be noted that there are many advantages inherent in the use of a positively acting speed-change gear. With this form of transmitting mechanism there is an insignificant wearing of the parts, with a consequent avoidance of the necessity for replacing the same, and there are also marked advantages in respect to reliability, silence in action and economy in power. One of the principal objections to this mechanism is the danger of carelessly changing the gears without shutting off the power, which results in a severe shock and, possibly, the stripping of the teeth of the gear. The latter, on account of the expense of well-made gears, is extremely undesirable. For this reason it is highly desirable that positively acting mechanism be provided which avoids the possibility of operating the speed-change mechanism without first throwing out power. Moreover, it is also highly desirable to have the braking mechanism so arranged as to automatically throw out the clutch when the brake is applied, as, in cases of the sudden application of the same sometimes necessary, the power is left in, owing to the carelessness or excitement of the person in charge, and the braking effect partly neutralized thereby. The above and other advantages are secured in constructions of the nature of that herein described.

Referring now to Fig. 1, there is represented at 1 a shaft driven by any desired source of power. Fixed adjacent the end of this shaft is a plate 2, the function of which will be hereinafter described, and the spur-gear 3, these parts preferably being secured to the shaft by means of key 4. Meshing with gear 3, is a gear 5 fixed upon a counter-shaft 6, which is mounted, as is shaft 1, within the walls of a casing 7. Likewise fixed upon said shaft 6 are a smaller gear 8, and a yet smaller gear 9, and on the end remote from gear 5 in a pinion 10, the shaft being preferably splined and the gears fixed by means of set-screws as shown, though any desired connection may be used between these parts. Casing 7 is preferably provided with enlarged bearings 11, in which the shafts 1 and 6 are journaled as above described.

Loosely mounted upon shaft 1 is a spur gear 12 which is adapted to serve as a means of transmitting power to any desired driven member. Gear 12 is preferably formed integral with a laterally recessed clutch member 13 adapted to receive the complementary clutch-member or core 14, as shown in Fig. 1 of the drawings. Formed integral with clutch-member 14 is a flanged hub 15 having positioned between the flanges thereof an operating fork 16, whereby the clutch may be thrown in or out as hereinafter described.

The hub 15 is preferably mounted upon a hollow polygonal shaft 17, which, in turn, is loosely mounted upon the shaft 1, by means of collars 18 and 19, the former of which is loose from the outer shaft and is adapted to abut against plate 2. Within the shaft 17 and coiled about the shaft 1 is a spring 20 which is compressed between the collars 18 and 19 and tends to urge the latter in the direction of clutch-member 13.

Fitting polygonal shaft 17 and slidable with relation thereto is a gear 21 provided with a hub 22 recessed so as to receive the end of an operating collar 23, as hereinafter described. Preferably formed integral with hub 22 is a gear 24, upon the lateral surface of which are positioned pins 25 registering with and adapted to engage recesses 26 in the plate 2 and form a rigid connection between these parts.

Clutch member 14, shaft 17 and the collar 19 are preferably rigidly secured together by means of the threaded pin 27, as shown in the drawings.

Collar 23, above-mentioned, is provided with trunnions 28, to which are pivotally secured lever-arms 29 fixed upon a rockshaft 30, upon the end of which is secured a controlling lever 31.

It will thus be seen that with the parts as above described the compressed spring 20 normally tends to force the complementary clutch surfaces into engagement and to hold them in this position without end-thrust upon the bearings of shaft 1, the entire transmission mechanism being prevented from lateral movement thereon by means of the shoulder 32 on this shaft, against which the thrust collar 33 in gear 12 abuts.

The gear 10 is adapted to intermesh with a gear 34 journaled within the casing as shown in Fig. 3, and the latter is adapted to mesh with the gear 21, thus providing an idler between gears 10 and 21 and resulting in a like direction of rotation of these parts.

The outer surface of clutch-member 13 is preferably cylindrical in form and is adapted to receive a brake-band 40 which preferably comprises a thin strip of steel rigidly connected to casing 7 at 41 and having a leather facing 42. This brake-band is connected at its free end 43 with a crank 44 fixed on rock shaft 45, and a lever arm 46 on this shaft has a slotted connection with a link 47, pivotally connected to a lever 48. Likewise pivotally connected to lever 48 is a link 49 connected to a bell crank lever 50, pivoted at 51 upon a stud upon casing 7 and the remaining arm of which is connected by a short link 52 with a pin 53 upon a collar 54. The latter member is fixed upon a longitudinally slidable rod 55, supported in bearings 56 and 57 formed upon the casing 7. It will thus be seen that the link 52, together with the arm of bell crank lever 50 connected therewith, forms a toggle joint whereby the rod 55 may be moved with considerable force.

Coaxially mounted with lever 48 is a lever 60 pivotally connected by means of a link 61 with the speed controlling lever 31 above described. These levers 48 and 60 are journaled at their lower ends upon a pin or spindle 70 mounted in perforated lugs or wings upon brackets 71 which may be bolted to any desired part. Substantially at right angles with the pin 70 is a pin 72 fixed within one of the brackets 71 and having journaled thereon an interlocking member 73. This member is provided upon its surface adjacent lever 60 with a series of notches 74, 75 and 76, corresponding to the several operative positions of the speed-change mechanism controlled by lever 60. These notches are adapted to coact with a lug or projection 78 formed upon the lever and when the same is seated in one of these notches the lever cannot be moved without a corresponding movement of locking member 73. Upon the opposite side of the locking member is formed a shoulder 79, upon one side of which the upper part of the member is of considerably greater thickness than the remainder thereof. When this thickened part 80 is in engagement with the lever 48 the locking member 73 is thrown into a position in which the lug 78 rests within one of the coacting notches, whereas when the lever 48 is opposite the thinner part 81 of locking member 73 a slight range of movement is permitted to the latter part, thus permitting free swinging of lever 60.

Locking member 73 is normally held in position against the lever 48 by means of a coiled spring 83 one end of which is fast to the bearing 84 thereof, and pin 72 is kept from rotating with the locking member 73 by means of a pin or key 85, as shown in Fig. 6 of the drawings.

It is obvious that other controlling members may be used in place of the levers shown, and the word "lever" is used throughout this specification and the following claims in a broad sense as comprehending any movable part having similar functions. It may also be noted at this point that by an operative position of the clutch is meant a position in which the clutch surfaces are in engagement and, similarly, an operative condition of the brake takes place when the same is applied.

The operation of the above-described embodiment of my invention is as follows: Assuming the parts to be in operative position with the clutch mechanism in engagement, it will be noted that there is no end thrust in either direction upon the shaft 1 as the spring 20 which holds the clutch members in engagement is compressed between the collars 18 and 19 and the effect thereof counterbalanced. Gear 21, together with the associated gear 24, is movable along the polygonal shaft 17 and the speed of transmission may be varied by reason of such movement in the following manner. With the gear 21 in the extreme of its path of travel toward the clutch, it intermeshes with gear 34 as above described and power is transmitted from shaft 1 through gears 3 and 5, thence through shaft 6, gears 10 and 34, to the gear 21 upon shaft 17. On account of the peculiar form of the latter, this member is rotated and the power transmitted through the clutch to the driving gear 12 from which it may be taken in any desired manner. With the parts in this position the speed is low and the movement "reversed". If gear 21 is now moved on the shaft 17 so as to bring it into a position in which it intermeshes directly with gear 9, the relative direction of rotation of shaft 1 and gear 12 is the same on account of the cutting out of the idler gear 34. This is the lowest speed forward transmission. If it is desired to use a higher speed, the sleeve is moved further so as to bring the gear 23 into engagement with gear 8, these parts being so proportioned as to increase the speed of gear 12 relative to that of shaft 1. The highest speed is attained when a yet further movement of the sleeve is made in this direction and the pins 25 are brought into engagement with the notches 26 of the plate 2, in which case these parts are effectively locked and the speed of rotation of shaft 17, and consequently that of gear 12, is equal to the speed of driving shaft 1. This longitudinal movement of the gears 24 and 21 is accomplished by means of the operating or shipping collar 23, which is actuated by means of the slotted levers 29 upon the rock shaft 30. The desired movement of this rock shaft is attained by means of lever 60 which has a direct connection therewith through link 61 and crank 31 as above described. The several notches in locking member 73 correspond to the several positions of rest of the gears above mentioned.

The clutch mechanism is operated by means of the shipping fork 16 which is controlled by means of the longitudinally movable rod 55 through the connection shown in Fig. 2 of the drawings. This part is actuated by means of the lever 48 as above described, and this lever is adapted upon an extreme forward movement to apply the brake by means of tightening the brake-band through rock shaft 45 and lever 44.

Owing to the slotted connection between the link 47 and the lever 46, a limited range of movement of the lever 48 is permitted without affecting the brake whereby the clutch may be thrown in or out, bringing the brake into action. It will be noted, however, that upon an extreme forward throw of this lever the clutch is first thrown out and the brake then applied with one continuous movement.

When the clutch is in operative position the parts are so positioned and proportioned that the lever 48 will rest against the thickened portion 80 of the locking member 73 and thus hold the same against the force of spring 83 in such position that the lug 78 upon lever 60 is within one of the recesses in the locking member. With the parts in this position it is impossible to move the lever 60 and consequently no movement of the speed-change mechanism either to increase or decrease the speed or reverse the direction of movement is possible. When it is desired to vary the speed or reverse the mechanism, the lever 48 must first be thrown forward into a position opposite the thinner portion 81 of the locking member corresponding to an inoperative position of the clutch. The lever 60 may then be used, as the power is thrown off, without injury to the gears. When the desired change of gears has been made and the proper gears are in exactly the desired position, the lug 78 will be opposite one of the notches in the locking member 73 and the clutch may again be thrown in by means of lever 48.

It will thus be seen that I have provided a controlling device, preferably for use upon motor vehicles, which is simple, reliable and efficient. In the above mechanism the advantages of positive change gears are secured without the usual attendant risks. The several parts, moreover, are positive in action and silent in operation and the power is economically used.

Certain features of this invention could be used with other forms of speed-change mechanism, but they are peculiarly adapted for use with mechanisms of the general type of that herein shown and described.

As many changes could be made in the above construction and many apparently widely different embodiments of my invention could be made without departing from the scope thereof, I intend that all matter contained in the above description and shown in the accompanying drawings shall be interpreted as illustrative and not in a limiting sense. I desire it also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:—

1. The combination of a pair of hand levers with an intermediate swing interlock, and connections whereby one of said levers is adapted to operate a brake and clutch and whereby the other of said levers is adapted to operate a change-gear mechanism.

2. The combination of a pair of pivoted hand-levers with a laterally moving interlock for the levers, and means for moving the interlock laterally, the interlock having notches for engagement with an opposed wall of one of the levers and also having relatively offset portions for coöperation with the other lever.

3. In combination, a speed change mechanism, a lever controlling the same, a clutch, braking mechanism, a lever controlling the same, means whereby said first-mentioned lever is locked when said second-mentioned lever is in a position corresponding to an operative condition of said clutch, and means whereby said braking mechanism is applied upon a further movement of said second-mentioned lever in the direction in which said clutch is thrown out.

4. In combination, a speed change mechanism, a lever controlling the same, a clutch, braking mechanism, a lever adapted upon movement in a certain direction to throw out said clutch and upon a further movement in the same direction to apply said braking mechanism, and means whereby said first-mentioned lever is locked when said second-mentioned lever is in a position corresponding to an operative condition of said clutch and is free when said second-mentioned lever is in position corresponding to an inoperative condition of said clutch.

5. In combination, a speed change mechanism, a lever controlling the same, a clutch, braking mechanism, a lever adapted upon movement in a certain direction to throw out said clutch and upon further movement in the same direction to apply the brake, and a laterally movable locking member adapted to be held in engagement with said first-mentioned lever when said second-mentioned lever is in a position corresponding to an operative condition of said clutch.

6. In combination, speed change mechanism, a lever controlling the same, clutch mechanism, a lever controlling said clutch mechanism, and a laterally swingable locking member held in engagement with said first-mentioned lever by said second-mentioned lever when the latter is in a position corresponding to an operative condition of said clutch.

7. In combination, speed change mechanism, a lever controlling the same, a clutch, a lever controlling said clutch, and a laterally swingable locking member interposed between said levers and held in engagement with said first-mentioned lever by said second-mentioned lever when the latter is in a position corresponding to an operative condition of said clutch.

8. In combination, speed change mechanism, a lever controlling the same, a clutch, a lever controlling said clutch, and a pivotally-mounted laterally-swingable locking member interposed between said levers and held in locking engagement with said first-mentioned lever by the engagement of a projecting part thereof with said second-mentioned lever when the latter is in a position corresponding to an operative condition of said clutch.

9. In combination, speed change mechanism, a lever controlling the same, a clutch, a lever controlling said clutch, and a laterally-swingable locking member provided with recesses and held in engagement with said first-mentioned lever, a part thereof projecting into one of said recesses when said second-mentioned lever engages a projecting part of said locking member.

10. In combination, a speed change mechanism, a lever controlling the same, a clutch, a lever controlling said clutch, a laterally-swingable locking member provided with recesses and held in engagement with said first-mentioned lever, a part thereof projecting into one of said recesses when said second-mentioned lever engages a projecting part of said locking member, and means whereby said first-mentioned lever is released upon the movement of said second-mentioned lever to a position corresponding to an inoperative condition of said clutch.

11. In combination, speed change mechanism, a lever controlling the same, a clutch, braking mechanism, a lever adapted upon movement in a certain direction to throw out said clutch and upon further movement in the same direction to apply said braking mechanism, and a laterally-swingable locking member interposed between said levers and held in locking engagement with said first-mentioned lever when said second-mentioned lever is in a position corresponding to an operative condition of said clutch.

12. In combination, a lever, connections whereby said lever is adapted to control a speed change mechanism, a second lever, connections whereby said second lever is adapted to control a clutch, and a laterally swingable member interposed between said levers adapted to lock said first-mentioned lever when said second-mentioned lever is in a position corresponding to an operative condition of said clutch.

13. In combination, a clutch, a brake, a lever adapted upon movement in a certain direction to throw out said clutch and upon further movement in the same direction to apply said brake, speed change mechanism, and connections whereby said mechanism is rendered operative upon said clutch being thrown out.

14. In combination, a clutch, a brake, a lever, connections between said lever and said brake, whereby the former is adapted upon movement in a certain direction to throw out said clutch without affecting said brake, connections whereby upon a further movement in the same direction said lever is adapted to apply said brake, speed change mechanism, and connections whereby said mechanism is rendered operative upon said clutch being thrown out.

15. In combination, a clutch, means adapted to control the same, a lever, a link connecting said controlling means and said lever, a brake, means adapted to control said brake, a slotted link connecting said lever and said brake-controlling means whereby said lever is adapted upon movement in a certain direction to throw out said clutch and upon a further movement in the same direction to apply said brake, speed change mechanism, and connections whereby said mechanism is rendered operative upon said clutch being thrown out.

16. In combination, a clutch, means adapted to control the same, a lever, a link connecting said controlling means and said lever, a brake, means adapted to control said brake, a slotted link connecting said lever and said brake-controlling means whereby said lever is adapted upon movement in a certain direction to throw out said clutch and upon a further movement in the same direction to apply said brake, speed-change mechanism, a lever controlling the same, and means whereby said second-mentioned lever is locked in position when said first-mentioned lever is in a position corresponding to an operative condition of said clutch.

17. In combination, speed-change mechanism, a lever controlling the same, a brake, a clutch, a lever controlling said brake and said clutch and adapted upon movement in a certain direction to throw out said clutch and upon a further movement in the same direction to apply said brake, and a laterally-swingable locking member between said levers adapted to be maintained in locking engagement with said first-mentioned lever when said second-mentioned lever is in a position corresponding to an operative condition of said clutch.

18. In combination, speed-change mechanism, a lever controlling the same, a brake, a clutch, a lever controlling said brake and said clutch and adapted upon movement in a certain direction to throw out said clutch and upon a further movement in the same direction to apply said brake, and a laterally-swingable locking member between said levers adapted to be maintained in locking engagement with said first-mentioned lever when said second-mentioned lever is in a position corresponding to an operative condition of said clutch and is in engagement with a projecting part of said locking member.

In testimony whereof I affix my signature in presence of two witnesses.

WELLINGTON PARKER KIDDER.

Witnesses:
M. E. COVENEY,
E. A. ALLEN.